United States Patent
Wu

(10) Patent No.: US 10,237,789 B2
(45) Date of Patent: Mar. 19, 2019

(54) DEVICE AND METHOD OF HANDLING FAILURE IN COMMUNICATIONS WITH MULTIPLE BASE STATIONS

(71) Applicant: HTC Corporation, Taoyuan (TW)

(72) Inventor: Chih-Hsiang Wu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 102 days.

(21) Appl. No.: 14/979,551

(22) Filed: Dec. 28, 2015

(65) Prior Publication Data

US 2016/0192249 A1   Jun. 30, 2016

Related U.S. Application Data

(60) Provisional application No. 62/096,879, filed on Dec. 25, 2014.

(51) Int. Cl.
*H04W 36/00* (2009.01)
*H04W 76/18* (2018.01)
(Continued)

(52) U.S. Cl.
CPC ... *H04W 36/0072* (2013.01); *H04W 36/0027* (2013.01); *H04W 76/15* (2018.02);
(Continued)

(58) Field of Classification Search
CPC ..... H04W 76/19; H04W 76/15; H04W 76/18; H04W 36/0027
See application file for complete search history.

(56) References Cited

U.S. PATENT DOCUMENTS

2011/0269426 A1* 11/2011 Hultin ................ H04W 12/10
455/411
2013/0329715 A1* 12/2013 Li ...................... H04W 16/02
370/338
(Continued)

FOREIGN PATENT DOCUMENTS

CN   101848473 A   9/2010
CN   104105212 A   10/2014
(Continued)

OTHER PUBLICATIONS

Notice of Allowance dated Aug. 30, 2016 for the Taiwan application No. 104143725, filing date Dec. 25, 2015, p. 1-4.
(Continued)

*Primary Examiner* — Brandon M Renner
*Assistant Examiner* — Jay L Vogel
(74) *Attorney, Agent, or Firm* — Winston Hsu

(57) ABSTRACT

A communication device comprises a storage unit for storing instructions and a processing means coupled to the storage unit. The processing means is configured to execute the instructions stored in the storage unit. The instructions comprise being configured to connect to a first base station and a second base station; detecting a connection failure in a first cell of the first base station when performing a secondary cell group (SCG) failure information procedure; performing a radio resource control (RRC) connection reestablishment procedure in response to the detection of the connection failure; and transmitting a SCG failure information message of the SCG failure information procedure to the first base station after transmitting a RRC connection reestablishment complete message of the RRC connection reestablishment procedure, or stopping performing the SCG failure information procedure in response to the connection failure or the RRC connection reestablishment procedure.

10 Claims, 5 Drawing Sheets

(51) Int. Cl.
*H04W 76/19* (2018.01)
*H04W 76/15* (2018.01)

(52) U.S. Cl.
CPC ........... *H04W 76/18* (2018.02); *H04W 76/19* (2018.02); *H04W 36/0069* (2018.08)

(56) References Cited

U.S. PATENT DOCUMENTS

| | | | |
|---|---|---|---|
| 2014/0192775 A1* | 7/2014 | Li | H04W 36/0072 370/331 |
| 2015/0049707 A1* | 2/2015 | Vajapeyam | H04W 24/10 370/329 |
| 2015/0117183 A1* | 4/2015 | Heo | H04W 36/0055 370/228 |
| 2015/0133122 A1* | 5/2015 | Chen | H04W 76/025 455/436 |
| 2015/0215826 A1* | 7/2015 | Yamada | H04W 36/0072 455/436 |
| 2015/0334551 A1* | 11/2015 | Aminaka | H04W 8/065 370/252 |
| 2016/0057802 A1* | 2/2016 | Lee | H04W 76/025 370/329 |
| 2016/0073442 A1* | 3/2016 | Koskinen | H04W 76/15 370/329 |
| 2017/0019945 A1* | 1/2017 | Chiba | H04W 76/025 |
| 2017/0086109 A1* | 3/2017 | da Silva | H04W 76/18 |
| 2017/0170941 A1* | 6/2017 | Yang | H04L 5/0098 |
| 2017/0318504 A1* | 11/2017 | Zhang | H04W 36/0055 |

FOREIGN PATENT DOCUMENTS

| | | |
|---|---|---|
| CN | 104219787 A | 12/2014 |
| EP | 2 805 538 | 11/2014 |
| KR | 1020140120807 | 10/2014 |
| WO | 2013091161 A1 | 6/2013 |
| WO | 2014111027 A1 | 7/2014 |

OTHER PUBLICATIONS

3GPP TS 36.331 V12.4.0 (Dec. 2014) Technical Specification 3rd Generation Partnership Project; Technical Specification Group Radio Access Network; Evolved Universal Terrestrial Radio Access (E-UTRA); Radio Resource Control (RRC); Protocol specification (Release 12).

3GPP TSG-RAN WG2 Meeting #88 R2-145410 San Francisco, USA, Nov. 17-21, 2014 CR-Form-v11 Change Request 36.300 CR 0675 rev—Current version: 12.3.0.

Search Report dated Jun. 27, 2016 for EP application No. 15202798.3, pp. 1-11.

China Mobile, "Discussion on RLF related issues", 3GPP TSG-RAN WG2 Meeting #84, R2-134164, Nov. 11-15, 2013, San Francisco, USA, XP050753130, pp. 1-3.

CATT, CATR, "RLM considerations for dual connectivity", 3GPP TSG RAN WG2 Meeting #84, R2-134053, Nov. 11-15, 2013, San Francisco, USA, XP050753342, pp. 1-4.

Office action dated Jul. 4, 2018 for the China application No. 201510995637.3 filing date Dec. 25, 2015, pp. 1-7.

* cited by examiner

DEVICE AND METHOD OF HANDLING FAILURE IN COMMUNICATIONS WITH MULTIPLE BASE STATIONS

CROSS REFERENCE TO RELATED APPLICATIONS

This application claims the benefit of U.S. Provisional Application No. 62/096,879, filed on Dec. 25, 2014, which is incorporated herein by reference.

BACKGROUND OF THE INVENTION

1. Field of the Invention

The present invention relates to a communication device and a method used in a wireless communication system, and more particularly, to a communication device and a method of handling a failure in communications with multiple base stations in a wireless communication system.

2. Description of the Prior Art

A long-term evolution (LTE)-advanced (LTE-A) system, as its name implies, is an evolution of the LTE system. The LTE-A system includes advanced techniques, such as carrier aggregation (CA), coordinated multipoint (CoMP) transmissions/reception, uplink (UL) multiple-input multiple-output (UL-MIMO), licensed-assisted access (LAA) using LTE, dual connectivity, etc.

A UE may receive/transmit packets (e.g., transport blocks (TBs)) from/to two eNBs, when the UE is configured to dually connect to the eNBs in the dual connectivity. One of the eNBs is a master eNB (MeNB) of the UE, and the other is a secondary eNB (SeNB) of the UE in the dual connectivity. When the UE detects a radio link failure occurs in a primary cell (PCell) (e.g., of the MeNB) in a master cell group (MCG), the UE may perform a RRC connection reestablishment procedure in response to the radio link failure. At the same time, the UE may also perform a SCG failure information procedure or a reporting of a radio link failure occurred on a primary secondary cell (PSCell) (e.g., of the SeNB) in the SCG. The operations (e.g., transmissions/receptions of related messages) of the procedures may collide, and wrong responses may be generated by the UE and/or the eNBs. Thus, handling of failure(s) related to multiple eNBs is an important problem to be solved.

SUMMARY OF THE INVENTION

The present invention therefore provides a communication device and method for handling a failure in communications with multiple base stations to solve the abovementioned problem.

A communication device of handling a failure in communications with a first base station and a second base station comprises a storage unit for storing instructions and a processing means coupled to the storage unit. The processing means is configured to execute the instructions stored in the storage unit. The instructions comprise being configured to connect to the first base station and the second base station; detecting a connection failure in a first cell of the first base station when performing a secondary cell group (SCG) failure information procedure; performing a radio resource control (RRC) connection reestablishment procedure in response to the detection of the connection failure; and transmitting a SCG failure information message of the SCG failure information procedure to the first base station after transmitting a RRC connection reestablishment complete message of the RRC connection reestablishment procedure, or stopping performing the SCG failure information procedure in response to the connection failure or the RRC connection reestablishment procedure.

A communication device of handling a failure in communications with a first base station and a second base station comprises a storage unit for storing instructions and a processing means coupled to the storage unit. The processing means is configured to execute the instructions stored in the storage unit. The instructions comprise being configured to connect to the first base station and the second base station; detecting a connection failure in a first cell of the first base station while detecting a connection failure in a second cell of the second base station or a SCG change failure; performing a radio resource control (RRC) connection reestablishment procedure in response to the detection of the connection failure; and not initiating a secondary cell group (SCG) failure information procedure for the connection failure of the second cell or the SCG change failure.

A first base station of handling a failure in communications with a communication device and a second base station comprises a storage unit for storing instructions and a processing means coupled to the storage unit. The processing means is configured to execute the instructions stored in the storage unit. The instructions comprise configuring the communication device to connect to the first base station and the second base station; receiving a radio resource control (RRC) connection reestablishment request message of a RRC connection reestablishment procedure from the communication device; transmitting a RRC connection reestablishment message of the RRC connection reestablishment procedure in response to the RRC connection reestablishment request message to the communication device; receiving a secondary cell group (SCG) failure information message of a SCG failure information procedure from the communication device, after transmitting the RRC connection reestablishment message and before receiving a RRC connection reestablishment complete message of the RRC connection reestablishment procedure from the communication device; and not determining whether the RRC connection reestablishment procedure is failed in response to the SCG failure information message, before receiving the RRC connection reestablishment complete message.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
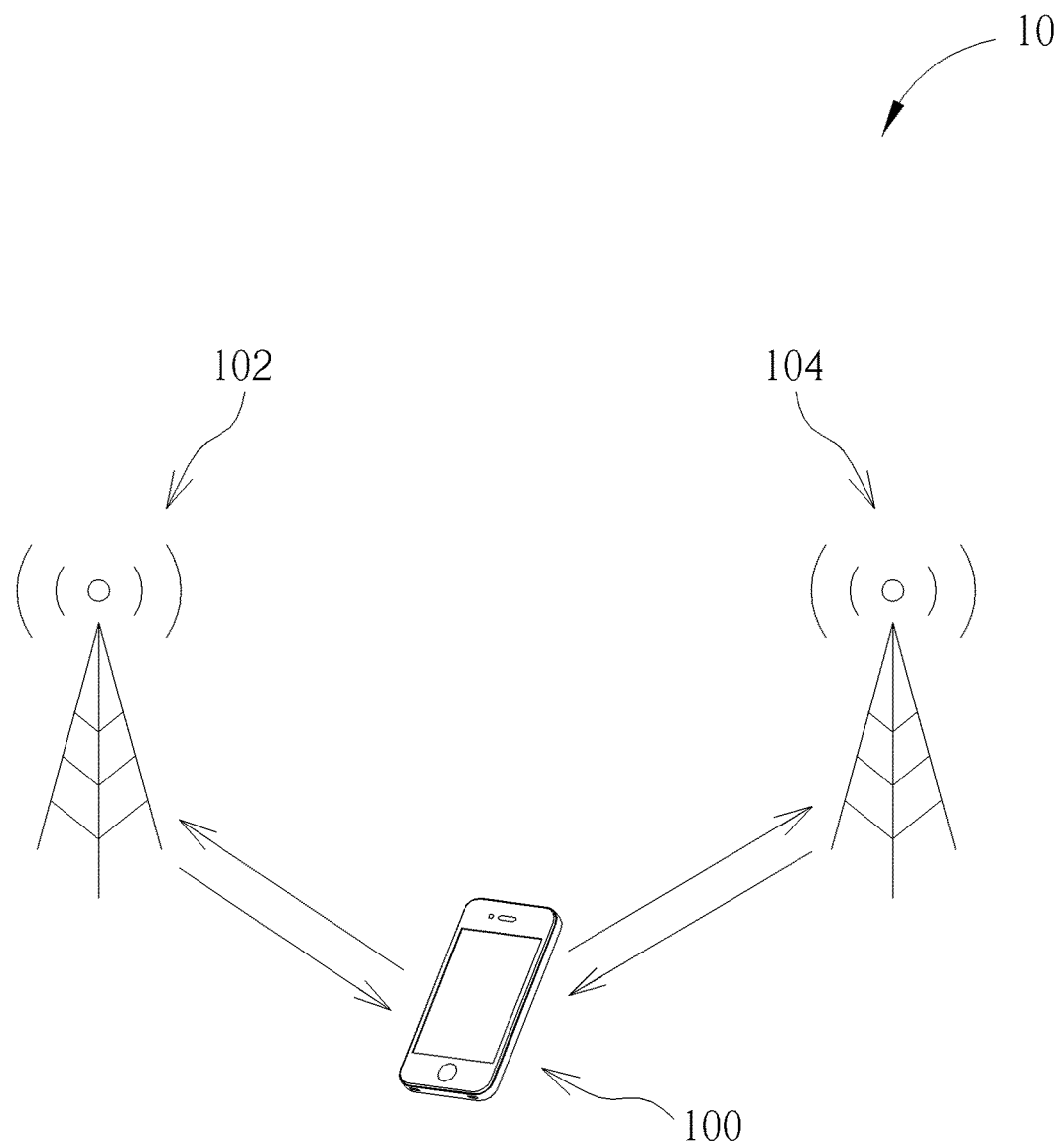
FIG. 1 is a schematic diagram of a wireless communication system according to an example of the present invention.

FIG. 1 is a schematic diagram of a wireless communication system 10 according to an example of the present invention. The wireless communication system 10 is briefly composed of a communication device 100, base stations (BSs) 102 and 104. In FIG. 1, the communication device 100, the BSs 102 and 104 and are simply utilized for illustrating the structure of the wireless communication system 10. Practically, the BS 102 and/or the BS 104 may be evolved NB(s) (eNB(s)) and/or relay(s) station in an evolved UTRAN (E-UTRAN), a long term evolution (LTE) system, a LTE-Advanced (LTE-A) system or an evolution of the LTE-A system. In FIG. 1, coverage areas of the BS 102 and the BS 104 may be partly overlapped.

As shown in FIG. 1, the communication device 100 may be configured to dually communicate with the BS 102 and the BS 104 at the same time according to dual connectivity. That is, the communication device 100 may perform a transmission/reception via both the BSs 102 and 104. For example, the communication device 100 may receive packets (e.g., protocol data units (PDUs)) from the BSs 102 and 104 according to the dual connectivity, or the communication device 100 may transmit packets (e.g., PDUs) to the BSs 102 and 104 according to the dual connectivity. In general, it means that the communication device 100 receives the packets from at least one cell of the BS 102 and at least one cell of the BS 104 according to the dual connectivity. Similarly, it means that the communication device 100 transmits the packets to at least one cell of the BS 102 and/or at least one cell of the BS 104 according to the dual connectivity. In addition, one of the BSs 102 and 104 may be a master eNB (MeNB) and the other BS may be a secondary eNB (SeNB) according to the dual connectivity defined in 3rd Generation Partnership Project (3GPP). One of the cell(s) of the MeNB communicating with the communication device 100 may be a primary cell (PCell) and the other cell(s) (if available) of the MeNB may be secondary cell(s) (SCell(s)). One of the cell(s) of the SeNB communicating with the communication device 100 may be a primary SCell (PSCell), and the other cell(s) (if available) of the SeNB may be SCell(s).

Technical terms related to the examples in the present invention are explained as follows. The dual connectivity may be an operation mode of a communication device in RRC_CONNECTED, configured with a master cell group (MCG) and a secondary cell group (SCG) to the UE. A MeNB in the dual connectivity may be an eNB which terminates at least S1-MME. A SeNB in the dual connectivity may be an eNB which provides additional radio resources but is not a MeNB. A MCG in the dual connectivity may be one or more serving cells associated with a MeNB, including a PCell and optionally one or more SCells. A SCG in the dual connectivity may be one or more serving cells associated with a SeNB, including a PSCell and optionally one or more SCells. A MCG bearer in the dual connectivity may be a bearer whose radio protocols are only located in a MeNB to use MeNB resources only. A SCG bearer in the dual connectivity may be a bearer whose radio protocols are only located in a SeNB to use SeNB resources. A split bearer in the dual connectivity may be a bearer whose radio protocols are located in both the MeNB and the SeNB to use both MeNB and SeNB resources.

The communication device 100 may be a user equipment (UE), a low cost device (e.g., machine type communication (MTC) device), a device-to-device (D2D) device, a mobile phone, a laptop, a tablet computer, an electronic book, a portable computer system, a vehicle, an airplane, or combination thereof. For an uplink (UL), the communication device 100 is the transmitter and the BS 102 and/or the BS 104 is the receiver, and for a downlink (DL), the BS 102 and/or the BS 104 is the transmitter and the communication device 100 is the receiver.

Figure 2:
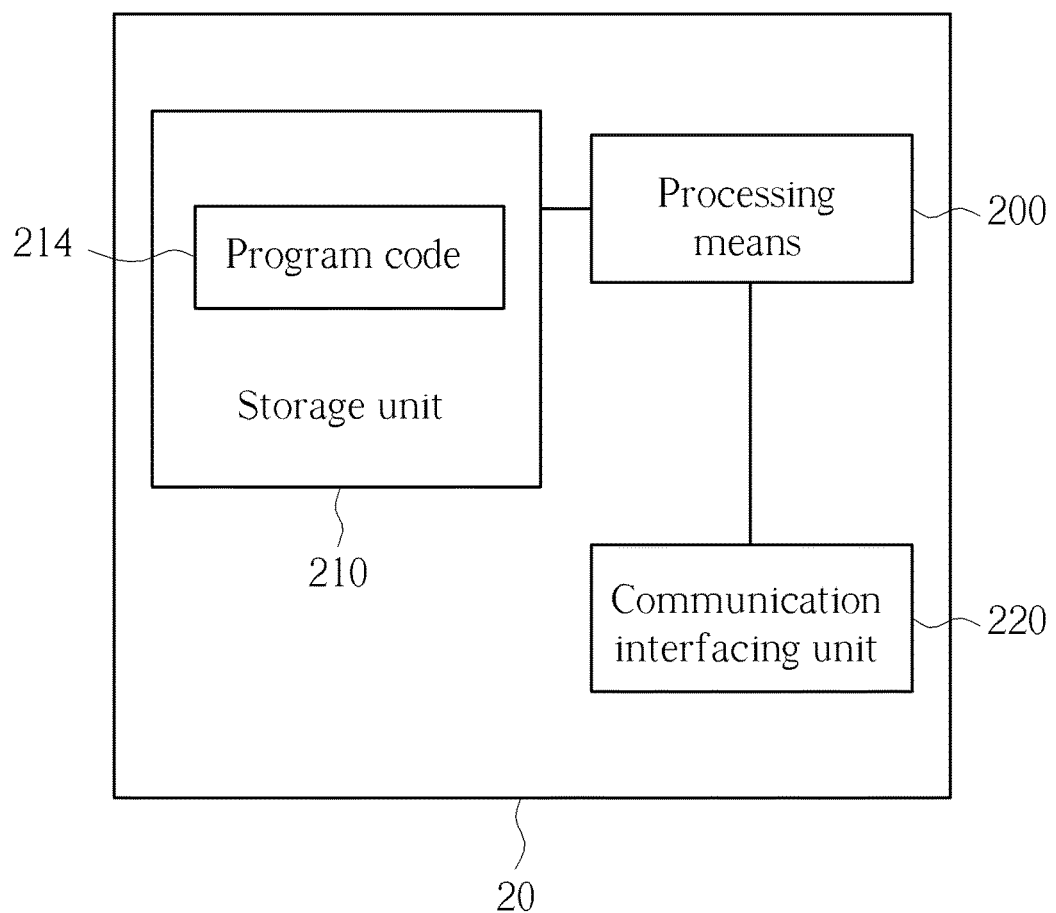
FIG. 2 is a schematic diagram of a communication device according to an example of the present invention.

FIG. 2 is a schematic diagram of a communication device 20 according to an example of the present invention. The communication device 20 may be the communication device 100, the BS 102 and/or the BS 104 shown in FIG. 1, but is not limited herein. The communication device 20 may include a processing means 200 such as a microprocessor or Application Specific Integrated Circuit (ASIC), a storage unit 210 and a communication interfacing unit 220. The storage unit 210 may be any data storage device that may store a program code 214, accessed and executed by the processing means 200. Examples of the storage unit 210 include but are not limited to a subscriber identity module (SIM), read-only memory (ROM), flash memory, random-access memory (RAM), Compact Disc Read-Only Memory (CD-ROM), digital versatile disc-ROM (DVD-ROM), Blu-ray Disc-ROM (BD-ROM), magnetic tape, hard disk, optical data storage device, non-volatile storage unit, non-transitory computer-readable medium (e.g., tangible media), etc. The communication interfacing unit 220 is preferably a transceiver and is used to transmit and receive signals (e.g., data, signals, messages and/or packets) according to processing results of the processing means 200.

Figure 3:
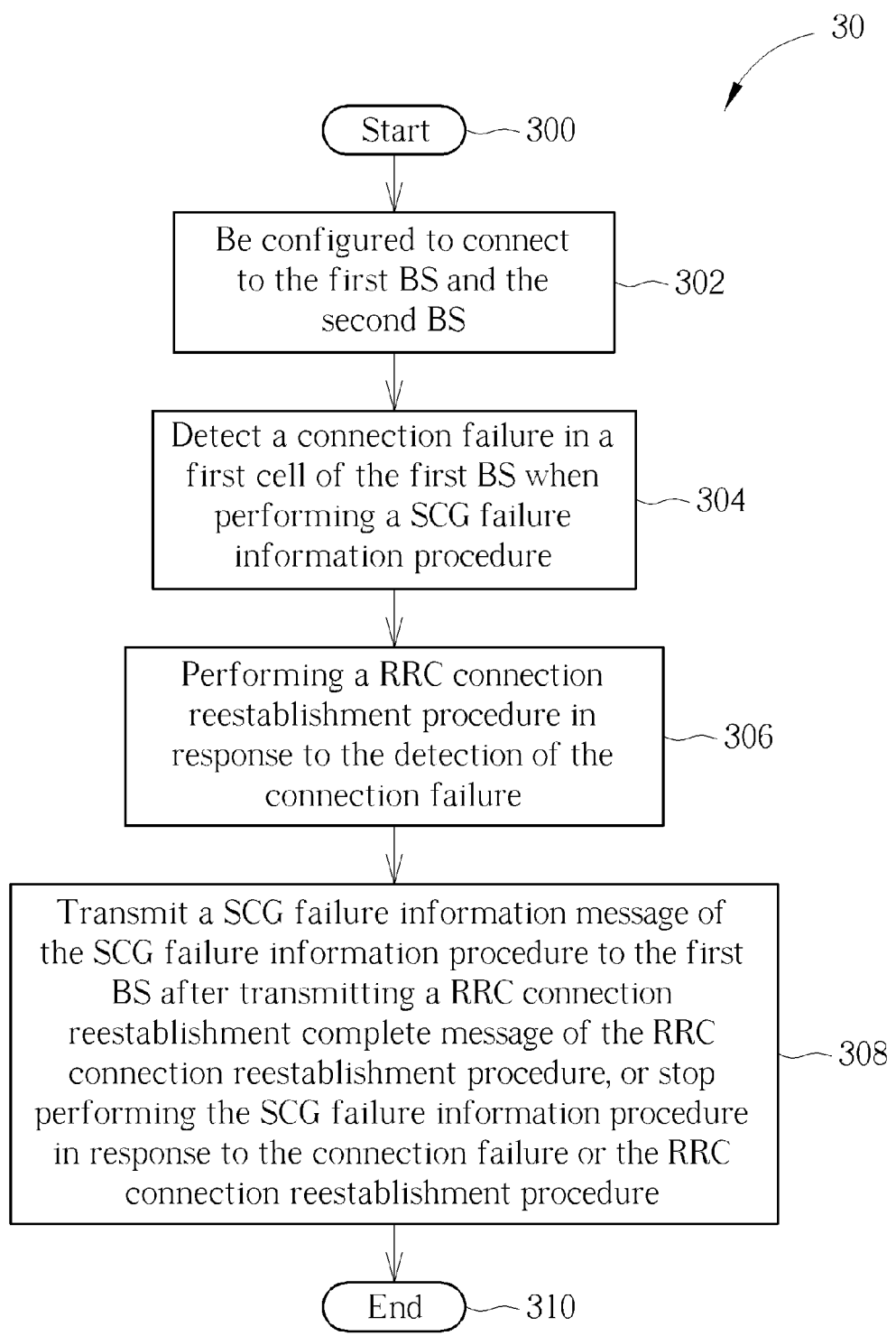
FIG. 3 is a flowchart of a process according to an example of the present invention.

FIG. 3 is a flowchart of a process 30 according to an example of the present invention. The process 30 may be utilized in a communication device (e.g., the communication device 100), to handle a failure in communications with multiple BSs (e.g., the BSs 102 and 104). The process 30 may be compiled into the program code 214 and includes the following steps:

Step 300: Start.

Step 302: Be configured to connect to the first BS and the second BS.

Step 304: Detect a connection failure in a first cell of the first BS when performing a SCG failure information procedure.

Step 306: Performing a radio resource control (RRC) connection reestablishment procedure in response to the detection of the connection failure.

Step 308: Transmit a SCG failure information message of the SCG failure information procedure to the first BS after transmitting a RRC connection reestablishment complete message of the RRC connection reestablishment procedure, or stop performing the SCG failure information procedure in response to the connection failure or the RRC connection reestablishment procedure.

Step 310: End.

According to the process 30, the communication device is configured to connect to the first BS (e.g., MeNB) and the second BS (e.g., SeNB) in dual connectivity. The communication device detects a connection failure in a first cell of the first BS while performing a SCG failure information procedure. The communication device may perform a RRC connection reestablishment procedure in response to the detection of the connection failure in the first cell. Then, the communication device may transmit a SCG failure information message of the SCG failure information procedure after transmitting a RRC connection reestablishment complete message of the RRC connection reestablishment procedure, or stop performing the SCG failure information procedure in response to the connection failure or the RRC connection reestablishment procedure. That solves a problem that the first BS may determine that the RRC connection reestablishment procedure is failed, if the first BS receives the SCG failure information message before receiving the RRC connection reestablishment complete message. According to the process 30, the communication device may transmit the RRC connection reestablishment complete message first, or may simply stop performing the SCG failure information procedure, to avoid the problem. As a result, the problem caused due to overlapped operations of the RRC connection reestablishment procedure and the SCG failure information procedure is solved.

Realization of the process 30 is not limited to the above description.

In one example, the step of being configured to connect to the first and seconds BSs may include being configured a RRC connection to the first BS and being configured a radio bearer (RB) to the second BS. In one example, the step of being configured to connect to the first and second BSs may include receiving a first configuration configuring at least one signaling radio bearer (SRB) for communicating with the first BS from the first BS, and receiving a second configuration configuring at least one data radio barer (DRB) as at least one split bearer or at least one SCG bearer for communicating with the second BS from the first BS. Note that the first BS may transmit the first configuration in a first RRC message to the communication device, e.g., RRCConnectionSetup message or a first RRCConnection-Reconfiguration message. The first BS may transmit the second configuration in a second RRC message to the communication device, e.g., a second RRCConnectionReconfiguration message. The communication device may transmit a RRC message (e.g., RRCConnectionReconfigurationComplete message) for responding to the RRCConnectionReconfiguration message. Further, the first configuration may include at least one of a SRB identity of the at least one SRB, a first RLC config and a first logical channel configuration. The second configuration may include at least one of a DRB identity of the at least one DRB, a second RLC config, a second logical channel configuration and a bearer type. In one example, the second configuration comprises a PSCell configuration which may include cell identity information for identifying a PSCell of the second BS.

In one example, the communication device in the process 30 may further select a second cell of the first BS, of the second BS or of a third BS for transmitting a RRC connection reestablishment request message of the RRC connection reestablishment procedure via the second cell. That is, the second cell for transmitting the RRC connection reestablishment request message may belong to any of the above-mentioned BSs. In one example, the connection failure may include a radio link failure, a handover failure, a mobility from E-UTRA failure, an integrity check failure or a RRC connection reconfiguration failure.

In one example, the SCG failure information procedure may be performed when detecting a radio link failure in a cell of the second BS or a SCG change failure. The SCG failure information message may indicate the radio link failure or the SCG change failure. In one example, the SCG failure information message may further include at least one measurement result of a PCell of the first BS and at least one measurement result of at least one cell of the second BS.

In one example, the first BS and/or the second BS may be replaced by a 5th generation (5G) BS. In another example, the second BS may be a WiFi access point supporting an operating frequency of 5 GHz, and the SCG information message may be used to inform a failure of WiFi connection or may be replaced by a specific RRC message which indicates the failure of WiFi connection.

Figure 4:
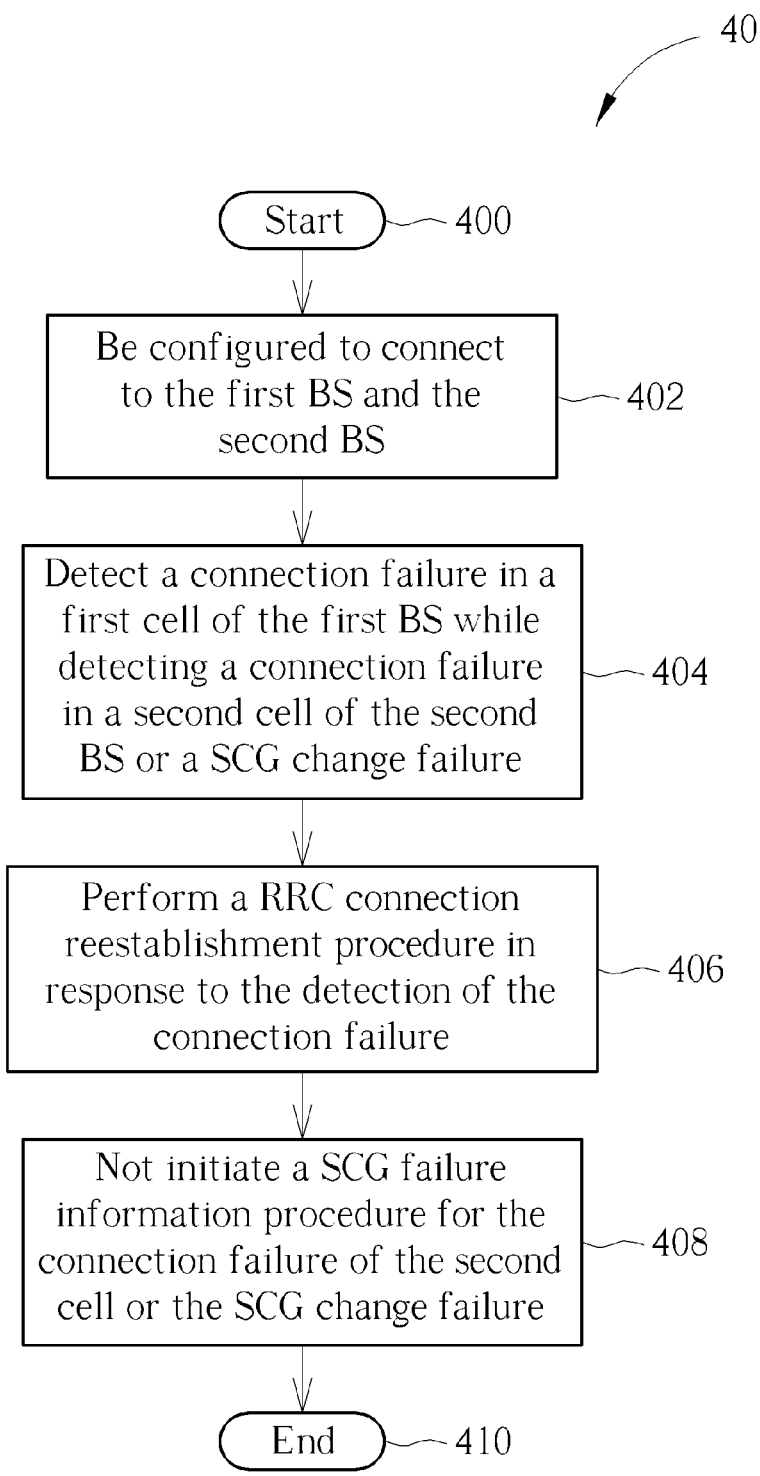
FIG. 4 is a flowchart of a process according to an example of the present invention.

FIG. 4 is a flowchart of a process 40 according to an example of the present invention. The process 40 may be utilized in a communication device (e.g., the communication device 100), to handle a failure in communications with multiple BSs (e.g., the BSs 102 and 104). The process 40 may be compiled into the program code 214 and includes the following steps:

Step 400: Start.

Step 402: Be configured to connect to the first BS and the second BS.

Step 404: Detect a connection failure in a first cell of the first BS while detecting a connection failure in a second cell of the second BS or a SCG change failure.

Step 406: Perform a RRC connection reestablishment procedure in response to the detection of the connection failure.

Step 408: Not initiate a SCG failure information procedure for the connection failure of the second cell or the SCG change failure.

Step 410: End.

According to the process 40, the communication device is configured to connect to the first BS (e.g., MeNB) and the second BS (e.g., SeNB) in dual connectivity. The communication device detects a connection failure in a first cell of the first BS while detecting a connection failure in a second cell of the second BS or a SCG change failure. Then, the communication device performs a RRC connection reestablishment procedure in response to the detection of the connection failure in the first cell but does not initiate a SCG failure information procedure for the connection failure of the second cell or the SCG change failure. That is, the SCG failure information procedure is not initiated to avoid overlapped operations of the RRC connection reestablishment procedure and the SCG failure information procedure. Thus, the first BS will not make a wrong decision regarding the RRC connection reestablishment procedure due to a SCG failure information message of the SCG failure information procedure. As a result, the problem caused due to the overlapped operations is solved.

Figure 5:
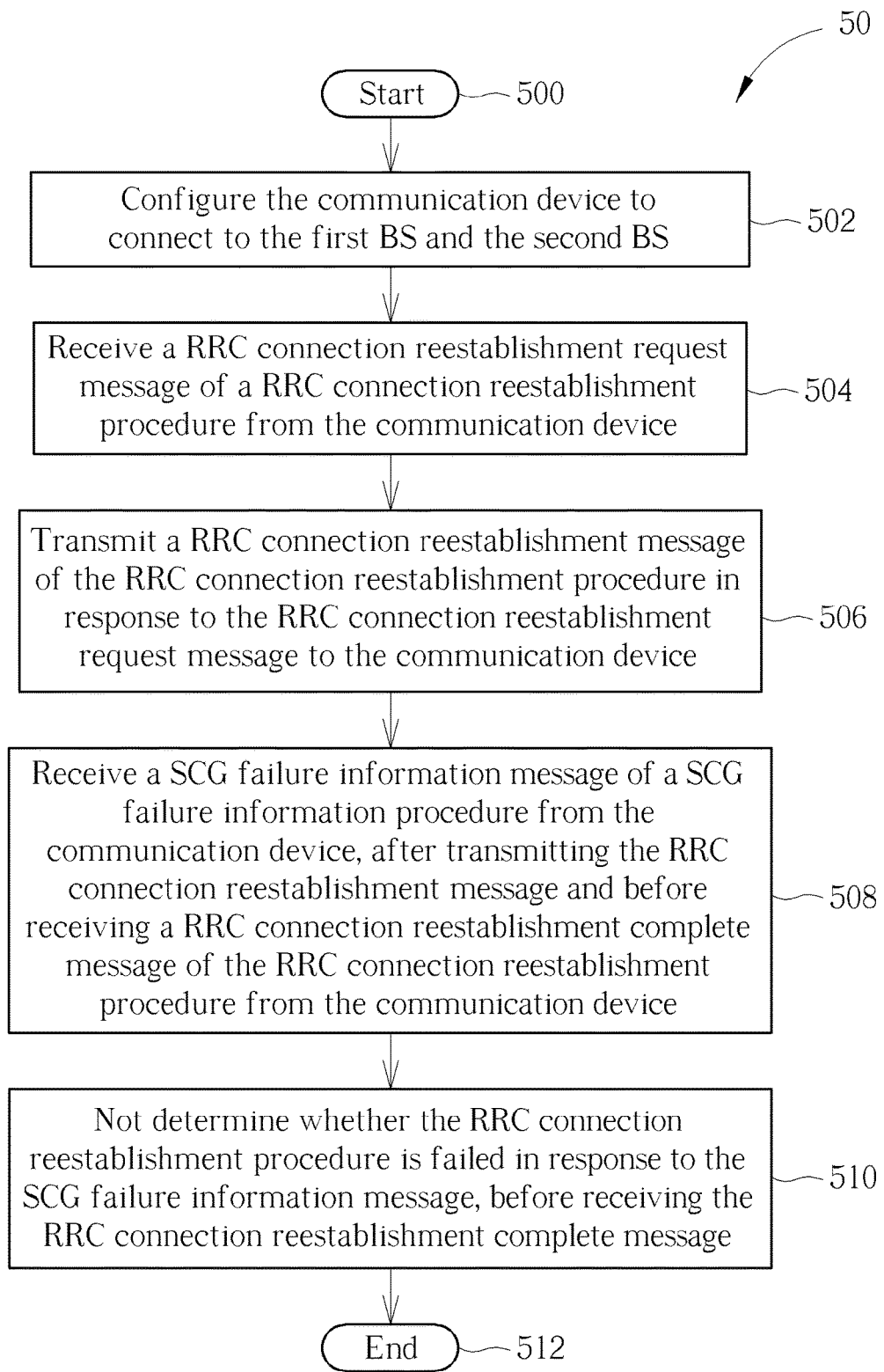
FIG. 5 is a flowchart of a process according to an example of the present invention.

FIG. 5 is a flowchart of a process 50 according to an example of the present invention. The process 50 may be utilized in a first BS (e.g., the BS 102), to handle a failure in communications with a communication device (e.g., the communication device 100) and the second BS (e.g., the BS 104). The process 50 may be compiled into the program code 214 and includes the following steps:

Step 500: Start.

Step 502: Configure the communication device to connect to the first BS and the second BS.

Step 504: Receive a RRC connection reestablishment request message of a RRC connection reestablishment procedure from the communication device.

Step 506: Transmit a RRC connection reestablishment message of the RRC connection reestablishment procedure in response to the RRC connection reestablishment request message to the communication device.

Step 508: Receive a SCG failure information message of a SCG failure information procedure from the communication device, after transmitting the RRC connection reestablishment message and before receiving a RRC connection reestablishment complete message of the RRC connection reestablishment procedure from the communication device.

Step 510: Not determine whether the RRC connection reestablishment procedure is failed in response to the SCG failure information message, before receiving the RRC connection reestablishment complete message.

Step 512: End.

According to the process 50, the first BS configures the communication device to connect to the first BS and the second BS in dual connectivity. The first BS receives a RRC connection reestablishment request message of a RRC connection reestablishment procedure from the communication device. The first BS transmits a RRC connection reestablishment message of the RRC connection reestablishment procedure in response to the RRC connection reestablishment request message to the communication device. Then, the first BS receives a SCG failure information message of a SCG failure information procedure from the communication device, after transmitting the RRC connection reestablishment message and before receiving a RRC connection reestablishment complete message of the RRC connection reestablishment procedure from the communication device. But, the first BS does not determine whether the RRC connection reestablishment procedure is failed in response to the SCG failure information message, before receiving the RRC connection reestablishment complete message. That is, even if the first BS receives the SCG failure information message first, the first BS does not makes a decision regarding the RRC connection reestablishment procedure immediately, but determines whether the RRC connection reestablishment procedure is failed according to whether the RRC connection reestablishment complete message is received from the communication device after the reception of the SCG failure information message. In other words, the first BS will not determine that the RRC connection reestablishment procedure is failed according to the reception of the SCG failure information message. As a result, the problem caused due to the overlapped operations is solved.

Realization of the processes and 40 and 50 are not limited to the above description. Examples of the steps in the process 30 can be applied to the steps in the processes 40 and 50.

Those skilled in the art should readily make combinations, modifications and/or alterations on the abovementioned description and examples. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means may be the communication device 20.

To sum up, the present invention provides a communication device and method of handling a failure in communications with multiple BSs. The method may be realized in a communication device and/or a BS according various system requirements and/or design considerations. Thus, the problem caused due to the overlapped operations of the BSs can be solved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A communication device of handling a failure in communications with a first base station and a second base station, comprising:
    a storage device; and
    a processing circuit, coupled to the storage device, wherein the storage device stores, and the processing circuit is configured to execute instructions of:
    being configured to connect to the first base station and the second base station;
    detecting a first connection failure in a first cell of the first base station and a second connection failure in a second cell of the second base station;
    performing a radio resource control (RRC) connection reestablishment procedure in response to the detection of the first connection failure and a secondary cell group (SCG) failure information procedure in response to the detection of the second connection failure; and
    transmitting a SCG failure information message of the SCG failure information procedure to the first base station after transmitting a RRC connection reestablishment complete message of the RRC connection reestablishment procedure to the first base station.

2. The communication device of claim 1, wherein the instruction of being configured to connect to the first base station and the second base station comprises:
    receiving a first configuration configuring at least one signaling radio bearer (SRB) for communicating with the first base station from the first base station; and
    receiving a second configuration configuring at least one data radio barer (DRB) as at least one split bearer or at least one SCG bearer for communicating with the second base station from the first base station.

3. The communication device of claim 1, wherein the instructions further comprise:
    selecting a third cell of the first base station, of the second base station or of a third base station for transmitting a RRC connection reestablishment request message of the RRC connection reestablishment procedure via the third cell.

4. A first base station of handling a failure in communications with a communication device and a second base station, comprising:
    a storage device; and
    a processing circuit, coupled to the storage device, wherein the storage device stores, and the processing circuit is configured to execute instructions of:
    configuring the communication device to connect to the first base station and the second base station;
    receiving a radio resource control (RRC) connection reestablishment request message of a RRC connection reestablishment procedure from the communication device;
    transmitting a RRC connection reestablishment message of the RRC connection reestablishment procedure in response to the RRC connection reestablishment request message to the communication device;
    receiving a secondary cell group (SCG) failure information message of a SCG failure information procedure from the communication device, after transmitting the RRC connection reestablishment message and before receiving a RRC connection reestablishment complete message of the RRC connection reestablishment procedure from the communication device; and
    not determining whether the RRC connection reestablishment procedure is failed in response to the SCG failure information message, before receiving the RRC connection reestablishment complete message.

5. The communication device of claim 4, wherein the instruction of configuring the communication device to connect to the first base station and the second base station comprises:
    configuring a RRC connection to the communication device; and
    configuring a radio bearer (RB) for communicating with the second base station to the communication device.

6. The communication device of claim 4, wherein the instruction of configuring the communication device to connect to the first base station and the second base station comprises:

transmitting a first configuration configuring at least one signaling radio bearer (SRB) for communicating with the first base station to the communication device; and transmitting a second configuration configuring at least one data radio barer (DRB) as at least one split bearer or at least one SCG bearer for communicating with the second base station to the communication device.

7. The communication device of claim 6, wherein the first configuration comprises at least one of a SRB identity of the at least one SRB, a first RLC config and a first logical channel configuration, and the second configuration comprises at least one of a DRB identity of the at least one DRB, a second RLC config, a second logical channel configuration and a bearer type.

8. The communication device of claim 6, wherein the second configuration comprises a primary secondary cell (PSCell) configuration comprising cell identity information for identifying a PSCell or the second base station.

9. The communication device of claim 4, wherein the SCG failure information message comprises at least one measurement result of a PCell of the first base station and at least one measurement result of at least one cell of the second base station.

10. The communication device of claim 4, wherein the instructions further comprise:

determining whether the RRC connection reestablishment procedure is failed according to whether the RRC connection reestablishment complete message is received from the communication device.

* * * * *